United States Patent
Mankame et al.

(10) Patent No.: US 8,567,188 B2
(45) Date of Patent: Oct. 29, 2013

(54) ACCELERATING COOLING IN ACTIVE MATERIAL ACTUATORS USING HEAT SINKS

(75) Inventors: Nilesh D. Mankame, Ann Arbor, MI (US); Patrick B. Usoro, Troy, MI (US); Alan L. Browne, Grosse Pointe, MI (US); Richard J. Skurkis, Lake Orion, MI (US); Nancy L. Johnson, Northville, MI (US); Xiujie Gao, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 438 days.

(21) Appl. No.: 12/792,120

(22) Filed: Jun. 2, 2010

(65) Prior Publication Data

US 2010/0236236 A1    Sep. 23, 2010

Related U.S. Application Data

(63) Continuation-in-part of application No. 12/437,768, filed on May 8, 2009, now Pat. No. 8,281,585, and a continuation-in-part of application No. 12/250,148, filed on Oct. 13, 2008.

(51) Int. Cl.
*F01B 29/10* (2006.01)
*F02G 1/04* (2006.01)

(52) U.S. Cl.
USPC .............................. 60/528; 60/529

(58) Field of Classification Search
USPC .................... 60/527–529
See application file for complete search history.

(56) References Cited

U.S. PATENT DOCUMENTS

| | | | |
|---|---|---|---|
| 2,810,290 A | 10/1957 | Scherer | |
| 2,998,725 A | 9/1961 | Scherer | |
| 3,048,908 A | 8/1962 | Bryan | |
| 3,152,554 A * | 10/1964 | Kofink | 417/321 |
| 3,339,077 A * | 8/1967 | Shapiro | 290/1 R |
| 3,366,865 A * | 1/1968 | Shapiro | 320/101 |
| 4,325,217 A * | 4/1982 | Golestaneh | 60/527 |
| RE31,472 E | 12/1983 | Keller | |
| 4,450,686 A * | 5/1984 | Banks | 60/527 |
| 4,490,975 A | 1/1985 | Yaeger et al. | |
| 4,559,512 A | 12/1985 | Yaeger et al. | |
| 4,691,517 A * | 9/1987 | Banks | 60/527 |
| 4,691,518 A * | 9/1987 | Banks | 60/527 |
| 5,622,482 A | 4/1997 | Lee | |
| 5,727,391 A | 3/1998 | Hayward et al. | |
| 5,996,346 A | 12/1999 | Maynard | |

(Continued)

FOREIGN PATENT DOCUMENTS

| | | |
|---|---|---|
| EP | 0137502 | 4/1985 |
| JP | 60-228778 | 11/1985 |

(Continued)

OTHER PUBLICATIONS

Local Displacements and Load Transfer in Shape Memory Alloy Composites; Johnalagada, K., Kline, G.E., Sottos, N.R.; Experimental Mechanics 37(1) (1997) pp. 78-86 & refs therein.

*Primary Examiner* — Kenneth Bomberg
*Assistant Examiner* — Christopher Jetton

(57) ABSTRACT

An actuator includes a thermally activated active material element, such as at least one shape memory alloy wire, and a heat sink configured to operatively engage the element and accelerate cooling after activation, so as to improve bandwidth.

20 Claims, 5 Drawing Sheets

(56) References Cited

U.S. PATENT DOCUMENTS

| | | |
|---|---|---|
| 6,401,309 B1 | 6/2002 | Yang |
| 6,648,279 B1 | 11/2003 | Malin et al. |
| 6,655,218 B1 | 12/2003 | Ogisu et al. |
| 6,732,516 B2 | 5/2004 | Butera et al. |
| 6,981,374 B2 * | 1/2006 | von Behrens et al. .......... 60/527 |
| 7,188,473 B1 | 3/2007 | Asada et al. |
| 7,600,301 B2 | 10/2009 | Rudduck et al. |
| 7,722,668 B2 | 5/2010 | Moaddeb et al. |
| 7,775,042 B1 * | 8/2010 | Tice ................. 60/529 |
| 7,793,497 B2 | 9/2010 | Alacqua et al. |
| 7,967,339 B2 | 6/2011 | Usoro et al. |
| 7,989,703 B2 | 8/2011 | Schaffer |
| 8,281,585 B2 * | 10/2012 | Gao et al. ......................... 60/529 |
| 2002/0113499 A1 | 8/2002 | von Behrens et al. |
| 2005/0172462 A1 | 8/2005 | Rudduck et al. |
| 2009/0250952 A1 | 10/2009 | Niskanen et al. |
| 2011/0168725 A1 | 7/2011 | Jacob |

FOREIGN PATENT DOCUMENTS

| | | |
|---|---|---|
| JP | 60-252172 | 12/1985 |
| JP | 2001-173550 | 6/2001 |
| JP | 2005-155427 | 6/2005 |

* cited by examiner

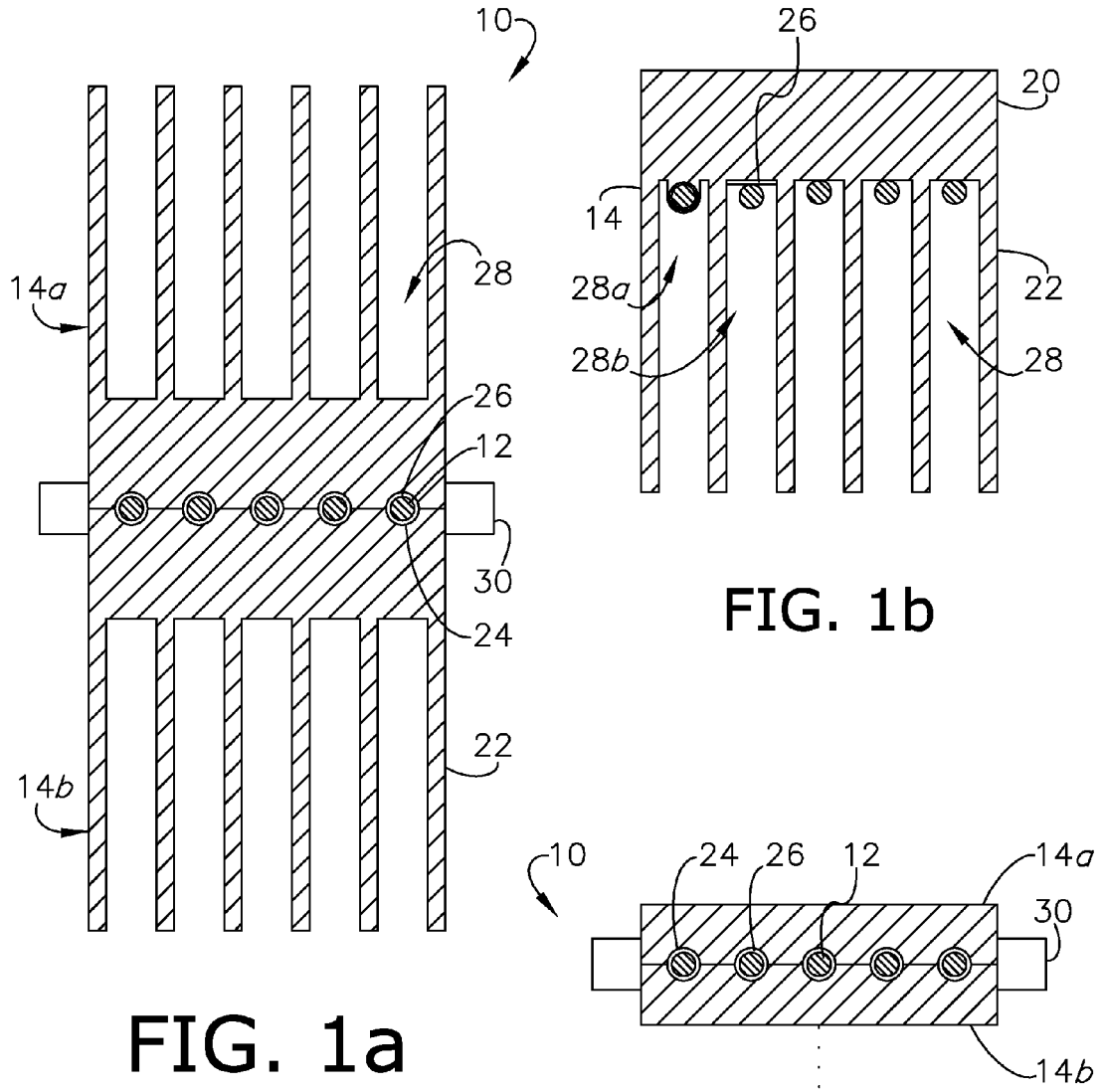
FIG. 1a
FIG. 1b
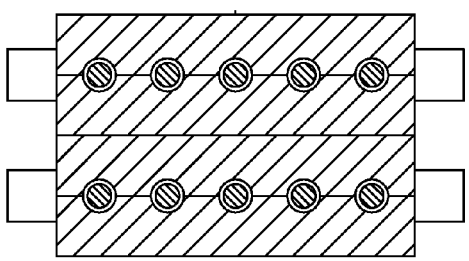
FIG. 1c

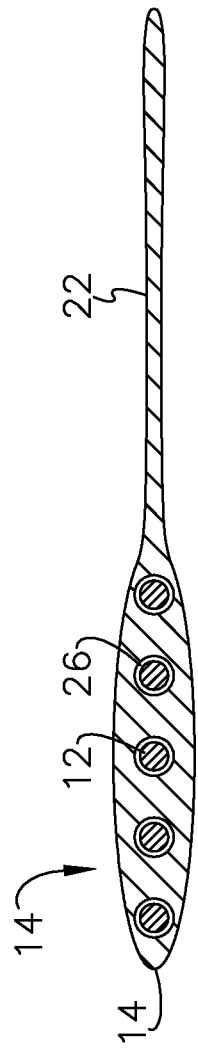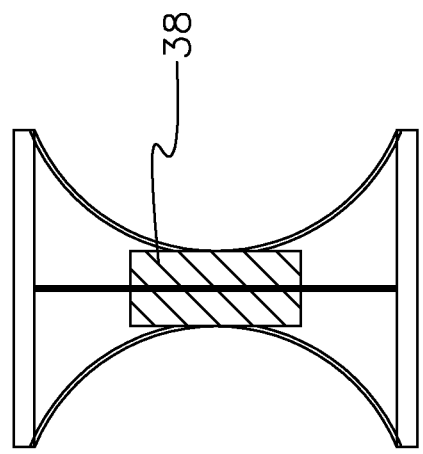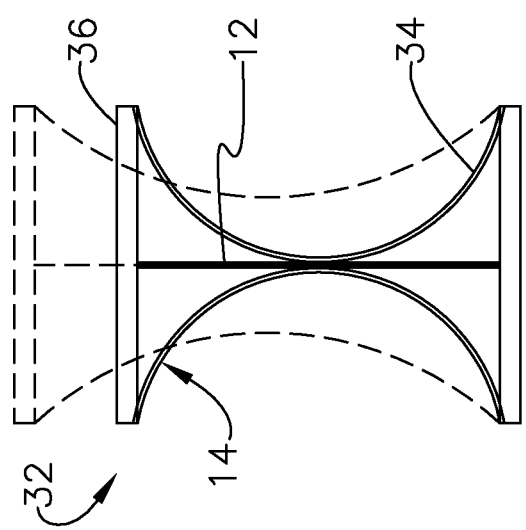

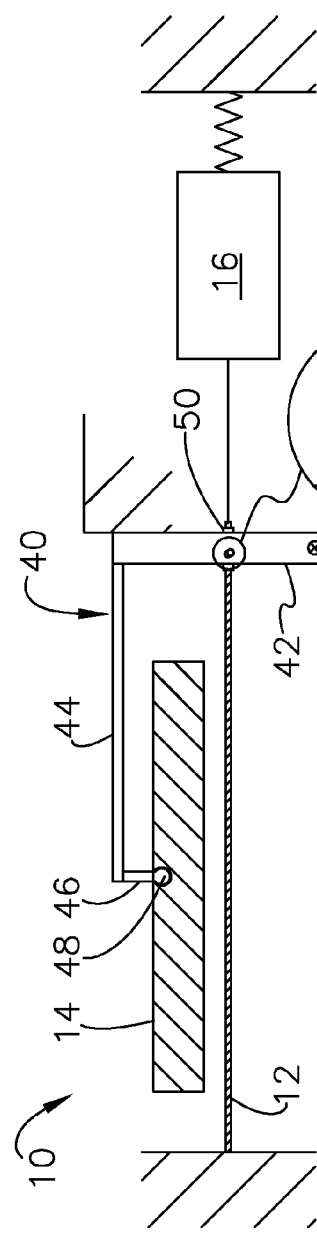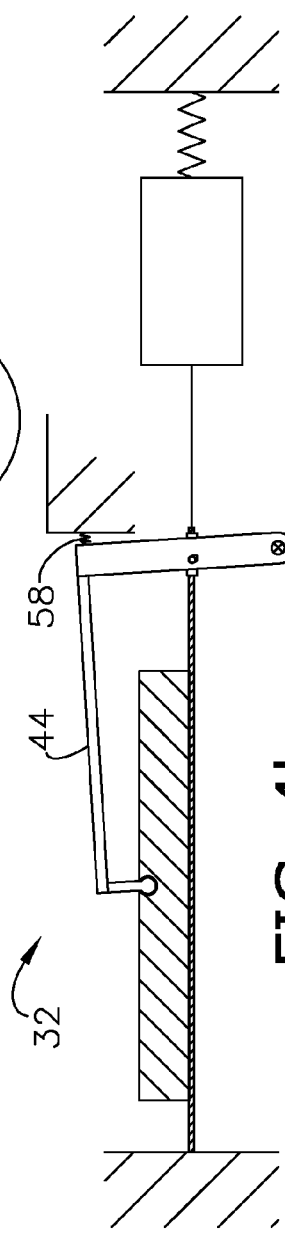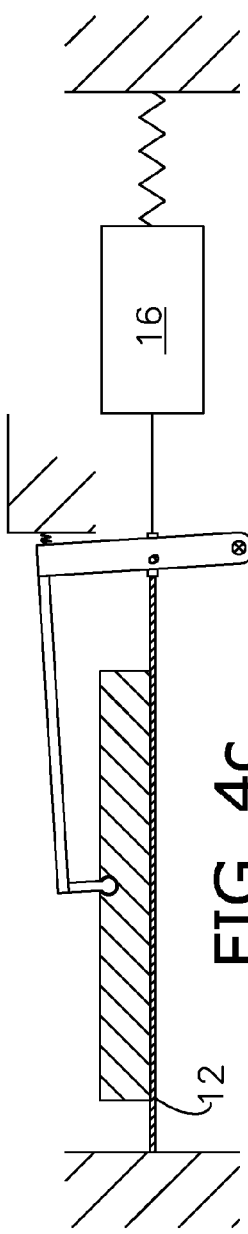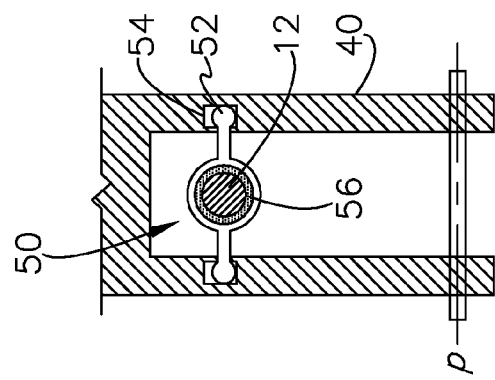

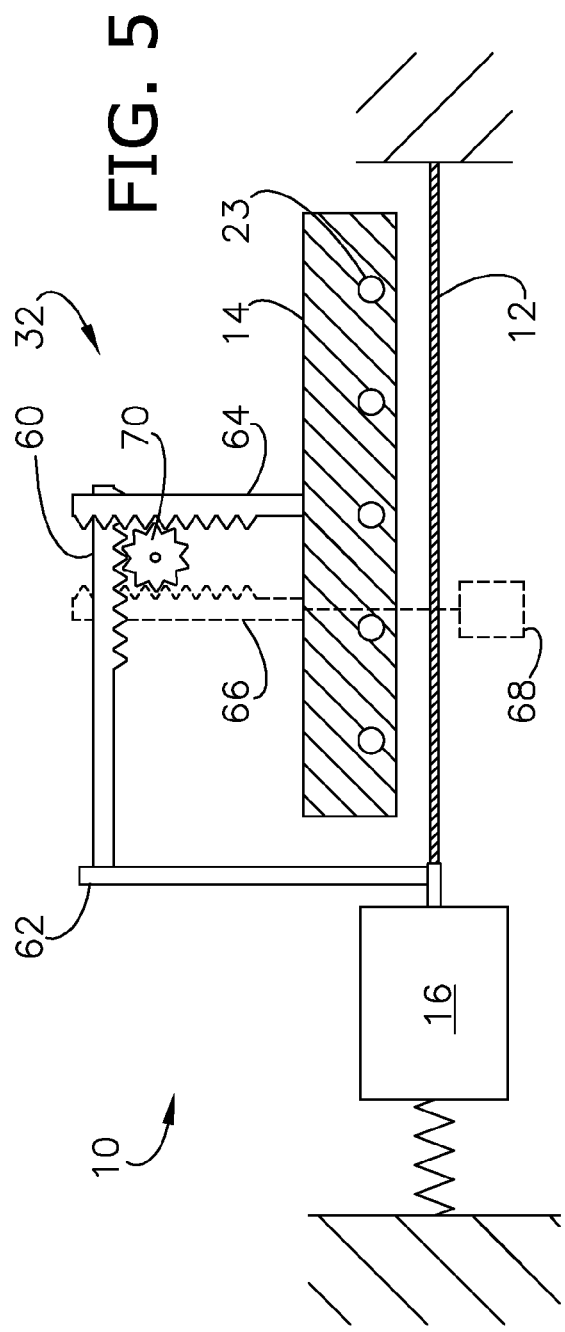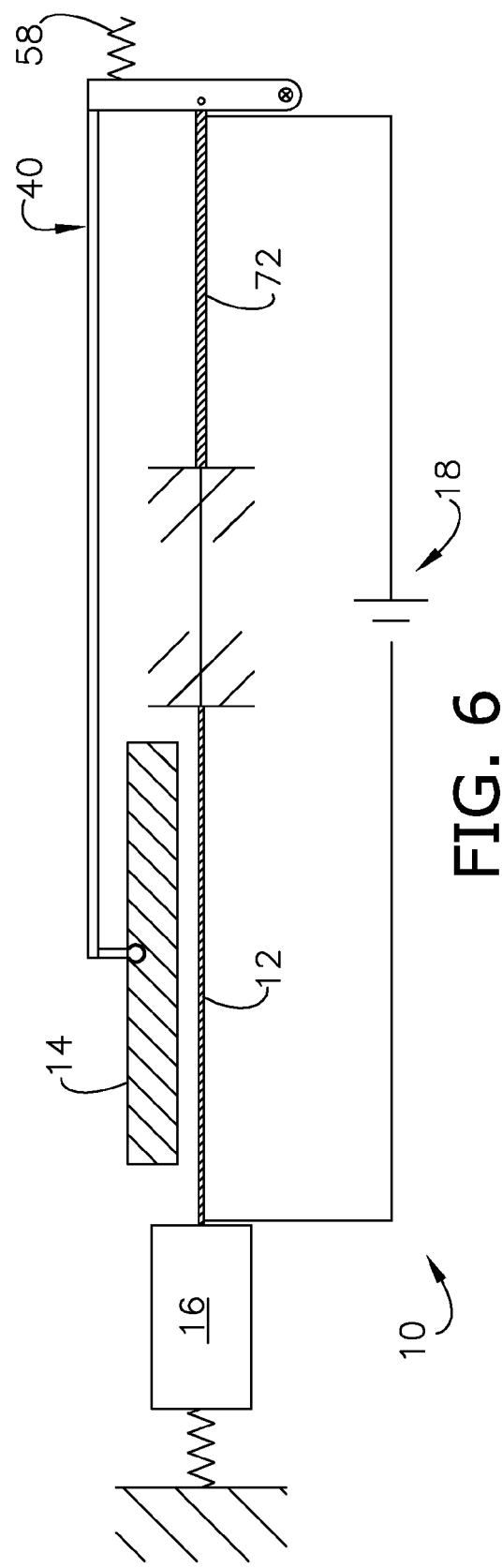

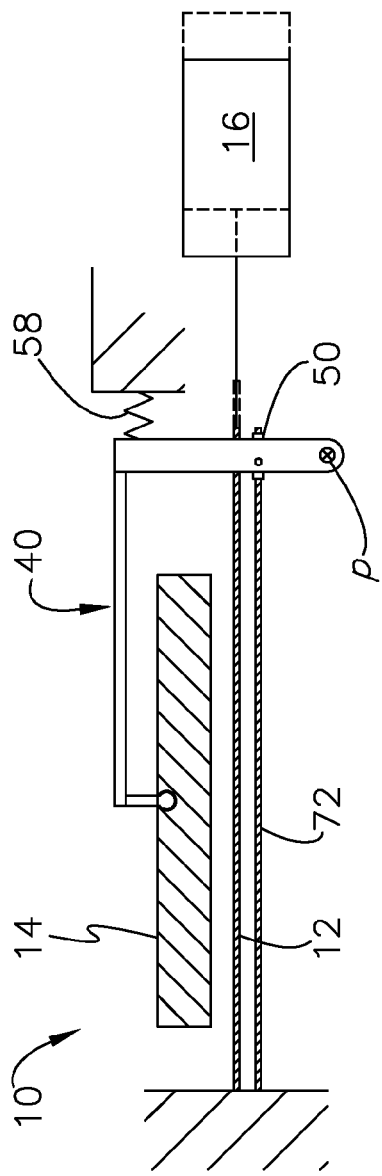
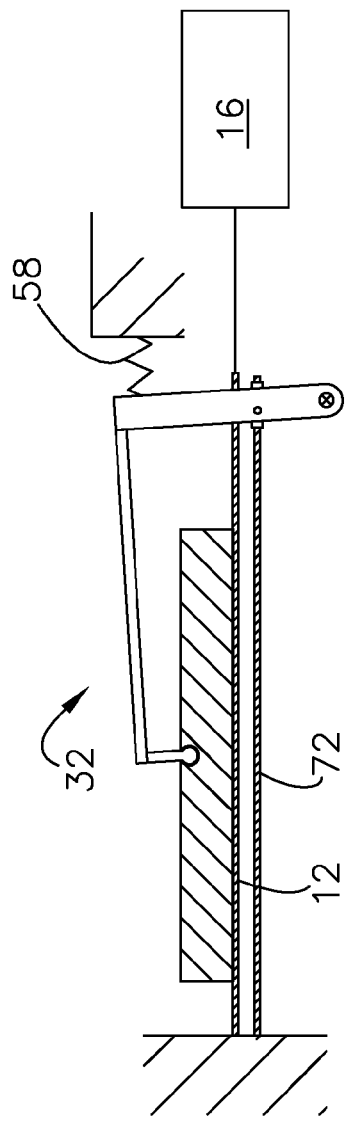
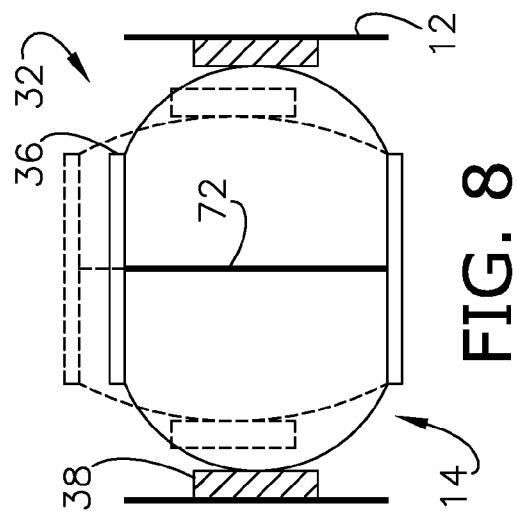

ACCELERATING COOLING IN ACTIVE MATERIAL ACTUATORS USING HEAT SINKS

RELATED APPLICATIONS

This patent application claims priority to, and continues-in-part from U.S. patent application Ser. No. 12/437,768, entitled "CONTROLLING HEAT TRANSFER IN ACTIVE MATERIAL ACTUATORS USING HEAT SINKS," filed on May 8, 2009, and U.S. patent application Ser. No. 12/250,148, entitled "ACTIVE MATERIAL ELEMENTS HAVING REINFORCED STRUCTURAL CONNECTORS," filed on Oct. 13, 2008, the disclosures of which being incorporated by reference herein.

BACKGROUND OF THE INVENTION

1. Field of the Invention

The present disclosure generally relates to assemblies for and methods of accelerating cooling in thermally activated active material actuators, and more particularly, to assemblies for and methods of accelerating cooling within such actuators utilizing both permanently and selectively engaged heat sinks.

2. Discussion of Prior Art

Thermally activated active material actuators, such as shape memory alloy (SMA) wires in the Martensite state, are activated by heating the material above an activation temperature. With respect to SMA wires, this generally causes the material to undergo phase transformation to Austenite, and contract in a manner that can be used to do work. Once activated, the actuator must undergo a relatively lengthy cooling period, wherein the temperature is lowered to a point below its transformation temperature, prior to being re-activated. During this period, the actuator is unavailable to do work, such that the duration of the cooling period substantially contributes to the total bandwidth of the actuator. Thus, it follows that reducing the predominate cooling period significantly increases the bandwidth.

Conventional methods of cooling, however, including simply exposing the material to ambient conditions, are often insufficient to meet these goals, and/or involve complex peripheral systems, such as forced air convection, etc. These concerns especially arise in the performance of active material actuators that are required to undergo rapid successive activations and/or effect quick return (e.g., <1 s) actuation. As such, there remains a long felt need in the art for an efficient assembly for and method of improving bandwidth by reducing the cooling period.

BRIEF SUMMARY OF THE INVENTION

The present invention addresses the afore-mentioned concerns by providing a novel active material actuator that utilizes a heat sink to accelerate cooling over a thermal activation cycle. As such, the invention is useful, among other things, for increasing bandwidth, and therefore increasing the work output of the actuator, without requiring an added source of cooling gas or liquid. The invention is further useful for reducing the likelihood of overheating during a thermal actuation cycle, which provides more efficient operation, and protects the integrity of the SMA actuator and/or device driven thereby.

In a first aspect of the invention, a thermally activated active material actuator is adapted for increasing bandwidth, and includes an active material actuator element and heat sink. The element is operable to undergo a reversible change in fundamental property when exposed to or occluded from a thermal activation signal, so as to heat and activate the element or enable the element to be cooled and deactivated, respectively. The element presents an ambient rate of cooling when occluded from the signal after being activated, and a first cooling period based upon the ambient rate. The heat sink presents a rate of thermal conductivity greater than the ambient rate, and autonomously engages the element when the element is activated, so as to present a second cooling period shorter than what would otherwise be provided by the first period.

The disclosure, including the use of an auxiliary active material element, a drive mechanism further including a pivot arm, rack and pinion transmission, and/or flexible bowed structures to drive the heat sink, and a heat sink defining grooves, coolant openings, and/or channels, or including fins to further accelerate cooling, may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1a is a cross-section of an active material actuator including plural shape memory alloy wires and a heat sink comprising first and second mated parts, and defining pluralities of grooves within which the wires are disposed and fins, in accordance with a preferred embodiment of the invention;

FIG. 1b is a cross-section of an inverted part shown in FIG. 1a, wherein the grooves are omitted and a plurality of wires are retained and spaced within channels defined by the fins, in accordance with a preferred embodiment of the invention;

FIG. 1c is a cross-section of a plurality of wires forming rows, and a sink comprising plural sets of stackable mated parts, wherein each set buttresses a row, in accordance with a preferred embodiment of the invention;

FIG. 2 is a cross-section of a plurality of wires, and a sink defining a horizontal fin, in accordance with a preferred embodiment of the invention;

FIG. 3a is an elevation of a wire actuator and a heat sink comprising first and second inwardly bowed, opposite, and flexible structures interconnected by end caps, shown in deactivated/disengaged (hidden-line type) and activated/engaged conditions, in accordance with a preferred embodiment of the invention;

FIG. 3b is an elevation of the actuator and sink shown in FIG. 3a, further including first and second opposite heat transfer masses/cooling pads connected to the structures and configured to increase the surface area of the sink, in accordance with a preferred embodiment of the invention;

FIG. 4a is an elevation of a wire and heat sink comprising a spring biased pivot arm drivenly coupled to the wire and heat transfer mass, shown in a normal configuration, wherein the actuating wire is deactivated, in accordance with a preferred embodiment of the invention;

FIG. 4b is an elevation of the actuating wire and heat sink shown in FIG. 4a, wherein the wire is beginning transformation and actuation, the pivot arm has been caused to pivot, and the sink caused to engage the wire;

FIG. 4c is an elevation of the wire and sink shown in FIGS. 4a,b, wherein the wire has completed transformation and actuation;

FIG. 4d is a partial cross-section of the pivot arm and wire shown in FIGS. 4a-c, further illustrating a collar intermediately coupling the arm and wire;

FIG. 5 is an elevation of an actuating wire, heat sink defining a plurality of coolant channels, and a drive mechanism including a rack and pinion transmission and a counterweight, in accordance with a preferred embodiment of the invention;

FIG. 6 is an elevation of an actuating wire and a heat sink drivenly coupled to an auxiliary wire and a spring biased pivot arm, wherein the actuator and auxiliary wires are connected in series, in accordance with a preferred embodiment of the invention;

FIG. 7a is an elevation of an actuating wire and a heat sink drivenly coupled to an auxiliary wire and a spring biased pivot arm, wherein the actuator and auxiliary wires arc connected in parallel, in accordance with a preferred embodiment of the invention;

FIG. 7b is an elevation of the actuating wire and sink shown in FIG. 7a, wherein the actuator and auxiliary have been sequentially activated, in accordance with a preferred embodiment of the invention; and FIG. 8 is an elevation of a wire actuator and a heat sink including first and second outwardly bowed, opposite, and flexible structures interconnected by end caps, the structures shown in deactivated/disengaged (hidden-line) and activated/engaged conditions, with first and second opposite heat transfer masses/cooling pads shown connected to the structures and configured to increase the surface area of the sink, in accordance with a preferred embodiment of the invention.

DETAILED DESCRIPTION OF THE INVENTION

In general, the present invention concerns a novel actuator 10 including a thermally activated active material element 12, such as at least one shape memory alloy (SMA) wire, and a heat sink 14 in operative contact with the element 12 (FIG. 1a-7b). The actuator 10 presents a bandwidth defined by a cycle that includes heating, activation, cooling, and deactivation periods. Both permanently and selectively engaged heat sink configurations are contemplated by the present invention. The heat sink 14 is operable to reduce the cooling period, and, more particularly, presents a thermal conductivity that, when compared to the rate of thermal heat transfer due to convection between the wire 12 and surrounding ambient space, presents accelerated cooling. More preferably, the heat sink 14 is operable to accelerate the rate of cooling by at least 25%, and most preferably by at least 100% in comparison to the otherwise ambient or non-heat sink engaged rate.

Though described herein with particular respect to SMA, it is within the ambit of the invention to utilize the benefits of the disclosure with actuators comprising other thermally activated active materials, such as shape memory polymer (SMP). The following more detailed description of the preferred embodiments is merely exemplary in nature and is in no way intended to limit the invention, its application, or uses. As used herein the term "wire" is non-limiting, and shall include other similar geometric configurations presenting tensile load strength/strain capabilities, such as cables, bundles, braids, ropes, strips, chains, and other elements to the extent compatible with the geometric limitations of the present invention.

As used herein, shape memory alloys (SMA's) generally refer to a group of metallic materials that demonstrate the ability to return to some previously defined shape or size when subjected to an appropriate thermal stimulus. Shape memory alloys are capable of undergoing phase transformations in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transformation, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy achieves its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

In typical use, SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transformation temperature.

Returning to FIGS. 1a-7b, the actuator 10 is operable to perform useful mechanical work, as a result of contraction by the wire 12. For example, as shown in FIGS. 4a-7b, the actuator 10 may be drivenly coupled to a load 16. The actuating wire 12 is typically coupled to a source 18 operable to deliver an activation signal thereto, but may be passively activated as well. For example, where Joule heating is used to generate the thermal signal through the resistance of the wire 12, the source 18 may be an electric power supply 18 (FIG. 6), such as the charging system of a vehicle. It is appreciated that a controller (not shown) may be intermediately and communicatively coupled to the supply 18 and wire 12 and configured to control actuation of the wire 12 and/or the timing of engagement between the heat sink 14 and wire 12, where selectively engaged.

In FIGS. 1a-2, plural cross-sectional configurations of preferred heat sinks 14 are shown. In FIG. 1a, the sink 14 operatively engages a plurality of wires 12, so as to define a contact area of engagement. More preferably, where the element (e.g., wire(s) 12) defines a length and width, the sink 14 defines a contact width greater than the element width, and a contact length not less than 25%, more preferably, not less than 50%, and most preferably not less than 75%, of the element length, so as to define the contact area of engagement.

The illustrated sink 14 presents a solid rectangular main body 20, a plurality of six "fins" (or thin, generally vertical, rectangular sections as shown) 22 emanating from the body 20, and a plurality grooves 24 defined by the body 20 opposite the fins 22 (FIG. 1a). The sink 14 is formed of material able to withstand exposure to the anticipated quantities of heat energy and provide the intended increase in thermal heat transfer rate. That is to say, the sink material presents a thermal conductivity (i.e., heat transfer coefficient) substantially greater than the normal transfer rates of the ambient space, e.g., 0.024 W/mK (the conductivity of air). For example, the sink 14 may be formed of copper (e.g., copper alloys), or aluminum (e.g., aluminum alloys), which present thermal conductivities of approximately 400 and 250 W/mK, respectively. At least a portion of the surface of the sink 14 may be polished, scarified, or otherwise treated to promote heat transfer.

The grooves 24 present concave formations defined by a radius or width slightly (e.g., preferably 2 to 5%) greater than the radius or width defined by the wire(s) 12 in the activated state, so that when disposed therein, the contact area of engagement is increased, and more preferably, so that the wire 12 generally contacts the sink 14 throughout the surface area of the groove 24. In a preferred embodiment, the radius defined by the grooves 24 is further increased and the actuator 10 further includes a thermal grease or other heat transfer interface 26 intermediate the sink 14 and wire 12. The preferred interface 26 functions to facilitate sliding, and enable heat transfer, without experiencing unsustainable degradation over a high volume of cycles.

Alternatively, it is appreciated that the sink 14 of FIG. 1a may be inverted, and the wires 12 disposed within channels 28 defined by the fins 22 (FIG. 1b). Here, a dedicated guide may be defined by the sink 14 in each channel 28, as shown in the first channel 28a of FIG. 1b, so as to increase the contact surface area of engagement as well as structural stability; a thermal grease or interface 26 may again be provided, as shown in the second channel 28b of FIG. 1b; or the sink 14 may be caused to rest directly upon the wires 12, as shown in the remaining channels 28. Thus, in a first aspect of the invention, the sink 14 may further present a spacer-cum-fin that spaces the wires 12 so as to separate their plumes and accelerate individual wire cooling.

As shown in FIGS. 1a,c, the preferred sink 14 includes upper and lower mated parts 14a,b that cooperatively function to increase the contact area of engagement by contacting the upper and lower halves of the wire(s) 12, respectively. In FIGS. 1a-c, for example, the sink 14 includes a second identical body 20 having fins 22, etc. Where wires 12 define plural rows (or other configurations), the sink 14 may consist of plural sets of mated parts 14a,b that engage each row or otherwise accommodate the configuration. In FIG. 1c, for example, the fins 22 have been removed from the bodies 20, so as to facilitate stacking of the plural sets and rows. As shown in FIGS. 1a,c, fasteners (e.g., bolts) 30 may be used to interconnect and fixedly secure the mated parts 14a,b adjacent the wires 12, so as to effect permanent engagement between the sink 14 and wires 12.

In this configuration, the mated grooves 24 define internal channels or spaces within which the wires 12 are retained. In the deactivated condition, the preferred wires 12 minimally contact the sink 14 ideally along a tangential line defined by the circular cross-sections of each wire 12 and groove 24 (FIGS. 1a,c). Any heat loss caused by the sink 14 during activation is negligible, as it is appreciated that SMA actuation is largely adiabatic. When activated, the wire 12 radially expands, so as to fill the space and substantially increase the contact area of engagement between the wire 12 and sink 14. By doing so, each wire 12 is able to transfer heat energy at an accelerated rate, due to the increased thermal heat transfer rate offered by the sink 14 and the increased contact area of engagement. Thus, though permanently inter-engaged, it is appreciated that minimal heat transfer will occur, as a result of minimal contact pre-activation; but that increased heat transfer will occur once the wires 12 are activated.

As shown in FIG. 2, the sink 14 may present a uniform body that envelopes the wires 12. For example, the sink 14 may be molded around the wires 12 or, where comprised of foil or the like, wrapped around the wires 12 at least once. As also shown in FIG. 2, a singular fin 22 may be horizontally oriented to increase exposure to fluid flow and heat transfer due to convection. In this regard, it is appreciated that the sink 14 may be exposed to a specified fluid flow (not shown) that further increases the rate of cooling. For example, the fin(s) 22 may be caused to engage a coolant or high-pressure air flow that draws heat away from the surface of the fin(s) 22, and in turn the wires 12; or, as shown in FIG. 5, a plurality of coolant openings 23 may be defined by the main body 20 and fluidly coupled to a coolant source (not shown). In another aspect of the invention, it is appreciated that the sink 14 may be used to accelerate heating, for example, by running a heated fluid through the openings 23 and causing selective engagement either before or during the heating or activation periods.

More preferably, the novel actuator 10 is configured such that the sink 14 and wire 12 autonomously and selectively engage, and to that end, further includes a drive mechanism 32. The drive mechanism 32 is drivenly coupled to the sink 14 and operable to cause its displacement to a point of contact with the wire 12. The mechanism 32 is preferably configured to cause such contact, without applying excessive stress loads to the wire 12. FIGS. 3a-7b illustrate exemplary embodiments of selectively engaging sinks 14.

In FIG. 3a, the drive mechanism 32 is driven by the actuating wire 12 itself, and includes first and second bowed structures 34 formed of suitable material. The structures 34 and wire 12 run generally parallel and are interconnected by end caps 36. As shown, the structures 34 are bowed inward towards the wire 12, flexible, and configured to flex from a default normal configuration, wherein they are disengaged from the deactivated wire 12 (shown in hidden-line type in FIG. 3a) to a more bowed configuration when the wire 12 is activated (shown in continuous-line type in FIG. 3a). The structures 34 and wire 12 are cooperatively configured such that in the more bowed configuration, the structures 34 tangentially contact the wire 12 and then preferably continue to bow so as to increase the contact area of engagement and generally absorb any further actuating force imparted after contact. It is appreciated that the structures 34 produce an increasing bias towards the normal configuration as they are caused to further bow, that the biasing force functions to return the sink 14 to the normal configuration upon the deactivation of the wire 12, and that the biasing force produces pre-strain within the wire 12 in the deactivated condition, which improves the reaction of the actuator 10 to subsequent activation.

As shown in FIG. 3b, heat transfer masses (i.e., cooling pads) 38 may be affixed to the structures 34 along their longitudinal midlines, and configured to engage the wire 12 in the activated condition to further increase the surface area and heat transfer rate of the sink 14. The preferred pads 38 define a longitudinal groove (not shown) that, as previously discussed, increases the contact area of engagement. Again, the structures 34 are preferably configured to further bow after contact so as to absorb any residual actuating force.

In FIGS. 4a-d, a self-actuating embodiment is shown wherein the drive mechanism 32 includes a pivot arm 40. The pivot arm 40 is pivotally coupled to fixed structure near one end, so as to define a pivot axis, p, and is drivenly coupled to the actuating wire 12. The pivot arm 40 defines main and extender portions 42,44, as illustrated. The extender portion 44 extends from the distal or free end of the main portion 42 a predetermined distance relative to the wire length and intended length of engagement. At the end of the extender portion 44, a connecting portion 46 distends towards the sink 14. The preferred connecting portion 46 and sink 14 cooperatively form a universal joint 48 so as to facilitate uniform engagement between the sink 14 and wire 12, despite the angularity of the arm 40.

As illustrated, the wire 12 is connected to the arm 40 at a point above the pivot axis, and more particularly at a point dependant upon the available recoverable strain in the wire 12, and the required swing by the arm 40. More preferably, a collar 50 (FIG. 4d) interconnects the wire 12 and main portion 42 of the arm 40. The collar 50 presents opposite ball joints 52 that are received within slots 54 defined by the arm 40. The ball joints 52 and slots 54 enable the arm 40 to convert the linear motion of the wire 12 into rotational motion. It is appreciated that the slot length is related to the degree of swing required by the arm 40. Where the collar 50 is fixedly engaged to the wire 12 it is preferred that contact between the sink 14 and wire 12 be made at the end of transformation and activation, so that undue stress by the sink 14 is not applied to the wire 12.

In FIGS. 4a-d, the mechanism 32 is configured to minimally swing before coming in contact with the wire 12 at the onset of activation, so as to minimize packaging. As such, the illustrated slots 54 present minimal lengths (FIGS. 4a,d). In this configuration, the collar 50 frictionally engages the wire 12, and preferably includes an interiorly disposed solid-lubricant 56, so as to enable sliding to occur and further work to be performed by the wire 12 (FIG. 4c), after initial contact between the sink 14 and wire 12. Thus, the necessary friction force between the solid-lubricant 56 and wire 12 is less than the actuation force, but greater than the force required to pivot the arm 40 towards the sink 14. More preferably, the lubricant 56 may be formed of additional active material, so as to be operable to selectively modify its grip and/or shearing force exerted upon the wire 12.

Once cooling is complete, two-way shape memory may be employed in this configuration to drive the arm 40 back towards the normal orientation. Here, it is appreciated that the friction force is further greater than the force required to pivot the arm 40 in the opposite direction and lift the sink 14. Alternatively, a biasing force may be presented, for example, by a torsional spring (not shown) coaxially aligned with the pivot axis, or an extension spring 58 (FIGS. 4a-7b) drivenly coupled to the arm 40, and configured to drive the arm 40 back towards the normal orientation. It is appreciated that the friction force, in the latter configuration, is greater than the sum of the required moment and bias.

Alternatively, in lieu of or addition to frictional engagement between the collar 50 and wire 12, it is appreciated that the connecting portion 46 may present a resistively collapsing configuration. For example, the connecting portion 46 may present a telescoping cylinder having a compression spring (not shown) coaxially housed therein. Here, the stiffness of the portion 46 is configured, such that the portion 46 collapses before a predetermined undesired stress load is transferred to the wire 12.

In FIG. 5, another self-actuating embodiment is presented wherein the drive mechanism 32 includes a rack and pinion configuration operable to convert the horizontal linear action of the wire 12 into the vertical displacement of the sink 14. More particularly, in the illustrated embodiment, a horizontal rack 60 is fixedly connected to the wire 12 at or near its free distal end by an elbow 62, so as to maximize displacement. A first vertical rack 64 is fixedly connected to the sink 14; and a second vertical rack 66 is fixedly connected to a counterweight 68. Each of the racks 60, 64, 66 is drivenly coupled to a pinion 70, with the vertical racks 64,66 oppositely engaging the pinion 70.

The racks 60, 64, 66 and pinion 70 are cooperatively configured such that when the wire 12 is activated, the horizontal rack 60 is caused to translate, the pinion 70 is caused to rotate clockwise, the first vertical rack 64 is caused to lower, the sink 14 is caused to engage the wire 12, and the weight 68 is simultaneously raised. So as to minimize the stress load experienced by the wire 12 when deactivated, the counterweight 68 and sink 14 are cooperatively configured to present a negligible positive difference, wherein the difference is equal to the load from the counterweight 68 minus the weight of the sink 14. It is appreciated that the negligible positive difference results in a normally up (i.e., disengaged) position for the sink 14 and a pre-strain in the wire 12 when deactivated; and that the actuation force produced by the wire 12 must overcome only the negligible difference, thereby enabling more force to be used to generate work. Conversely, where the sink 14 is functionally disposed beneath the wire 12 (in addition to or lieu of the illustrated transmission), it is appreciated that the transmission may be mirrored and a negligible negative difference be presented, so as to result in a normally down position for the sink 14 when the wire 12 is deactivated.

In other embodiments, the drive mechanism 32 includes a separate drive element 72 that is dedicated to sink displacement. In FIG. 6, for example, the drive element 72 includes at least one auxiliary shape memory alloy wire that is drivenly coupled to a pivot arm 40 as previously described with respect to FIGS. 4a-d. As such, a detail description of the manipulation of the arm 40 by the auxiliary wire 72 will not be repeated herein. However, it is appreciated that changes to the arm 40, such as lengthening the extender portion 44, may be necessary. Finally, it is certainly within the ambit of the invention to use more conventional drive elements 72, such as motors and solenoids, or other types of active material actuators, such as electro-active polymer tendons, to drive the sink 14.

The auxiliary wire 72 may be packaged and configured to act in series with (FIG. 6) or parallel to (FIGS. 7a,b) the actuating wire 12, or in combinations thereof. Where connected in series, the actuator and auxiliary wires 12,72 may be part of a common circuit, so that the same current and power supply 18 are used to activate both (FIG. 6). In either configuration, the auxiliary wire 72 is preferably activated after the actuating wire 12 has been activated, so that actuation is not compromised by the sink 14. For example, where connected in series, the auxiliary wire 72 may be formed of a shape memory alloy presenting a higher phase transformation temperature than that of the actuating wire 12, present a diameter greater than that of the actuating wire 12, or be further connected in parallel to additional wires or resistors (not shown).

In FIGS. 7a,b, an auxiliary wire 72 is connected to the pivot arm 40 and presents a parallel configuration relative to the actuating wire 12. Again, it is preferable that the actuating wire 12 be fully activated prior to activating the auxiliary wire 72 and engaging the wire 12 and sink 14. To that end, it is appreciated that sensory technology or resistance analysis of the actuating current may be used to detect complete actuation, and trigger activation of the auxiliary wire 72 only after detection. Alternatively, the actuating and auxiliary wires 12,72 may be cooperatively configured such that the auxiliary wire 72 is passively activated by heat generated from the actuating wire 12. Finally, in either embodiment, it is appreciated that the sink 14 may be configured to engage both the actuating and auxiliary wires 12,72, so as to accelerate heat transfer from both, and the availability of the entire actuator 10 for subsequent use.

In FIG. 8, the drive mechanism 32 is driven by the auxiliary wire 72, and includes first and second bowed structures 34 formed of suitable material. The structures 34 and wire 72 run generally parallel and are interconnected by end caps 36. As shown, the structures 34 are bowed outward towards the wires 12, flexible, and configured to flex from a default normal configuration, wherein they are disengaged from the wires 12 (shown in hidden-line in FIG. 8) to a more bowed configuration when the wire 72 is activated (shown in continuous-line in FIG. 8). As shown in FIG. 8, heat transfer masses (i.e., cooling pads) 38 may be affixed to the structures 34 along their longitudinal midlines, and configured to engage the wires 12 in the activated condition to further increase the surface area and heat transfer rate of the sink 14. The structures 34 and wires 12 are cooperatively configured such that in the more bowed configuration, the pads 38 contact the wires 12. The structures 34 are preferably configured to further bow after contact so as to absorb any residual actuating force imparted after contact. The preferred pads 38 define a longitudinal groove (not shown) that, as previously discussed, increases the contact area of engagement. It is appreciated that the structures 34 produce an increasing bias towards the normal configuration as they are caused to further bow, that the biasing force functions to return the sink 14 to the normal configuration upon the deactivation of the auxiliary wire 72, and that the biasing force produces pre-strain within the auxiliary wire 72 in the deactivated condition, which improves the reaction of the drive mechanism 32 to subsequent activation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A thermally activated active material actuator adapted for increasing bandwidth, said actuator comprising:
   an active material actuator element operable to undergo a reversible change in fundamental property, when exposed to or occluded from a thermal activation signal, so as to heat and activate the element or enable the element to be cooled and deactivated, respectively,
   wherein the element presents an ambient rate of cooling when occluded from the signal after being activated, and a first cooling period based upon the ambient rate; and
   a heat sink including at least one flexible bowed structure, the heat sink presenting a rate of thermal conductivity greater than the ambient rate, and autonomously engaging the element when the element is activated, so as to present a second cooling period shorter than the first period;

wherein the change causes the sink to autonomously engage or increase engagement with the actuator element and causes the structure to further bow towards and engage the actuator element, and the sink defines an exposed surface area.

2. The actuator as claimed in claim 1, further comprising at least one shape memory alloy wire included with the actuator element.

3. The actuator as claimed in claim 1, further comprising a cooling pad attached to the structure and configured to engage the element as a result of the change, and the pad increases the exposed surface area.

4. A thermally activated active material actuator adapted for increasing bandwidth, said actuator comprising:
an active material actuator element operable to undergo a reversible change in fundamental property, when exposed to or occluded from a thermal activation signal, so as to heat and activate the element or enable the element to be cooled and deactivated, respectively,
wherein the element presents an ambient rate of cooling when occluded from the signal after being activated, and a first cooling period based upon the ambient rate;
a heat sink presenting a rate of thermal conductivity greater than the ambient rate, and autonomously engaging the element when the element is activated, so as to present a second cooling period shorter than the first period; and
a separate drive element communicatively coupled and dedicated to the sink, and configured to cause the sink to autonomously engage the actuator element.

5. The actuator as claimed in claim 4, further comprising an active material auxiliary element included with the drive element operable to undergo a second reversible change in fundamental property when exposed to or occluded from an activation signal, so as to be activated or deactivated respectively.

6. The actuator as claimed in claim 5, wherein the auxiliary element is thermally activated, and the sink is configured to concurrently engage the actuator and auxiliary elements, so as to accelerate heat transfer from both.

7. The actuator as claimed in claim 5, wherein the auxiliary element is thermally activated, and the actuator and auxiliary elements are cooperatively configured and relatively positioned such that the actuator element passively activates the auxiliary element.

8. The actuator as claimed in claim 5, further comprising a pivot arm fixedly attached to the sink, and the second change is operable to cause the arm to pivot towards the actuator element.

9. The actuator as claimed in claim 5, further comprising at least one shape memory alloy wire included with both the auxiliary and actuator elements, and the wires are cooperatively configured such that the actuator wire is fully activated prior to activating the auxiliary wire.

10. The actuator as claimed in claim 9, wherein the actuator element presents a first total cross-sectional area, and the auxiliary element presents a second total cross-sectional area greater than the first total cross-sectional area.

11. The actuator as claimed in claim 9, wherein the actuator element presents a first transformation temperature, and the auxiliary element presents a second transformation temperature greater than the first transformation temperature.

12. The actuator as claimed in claim 9, wherein said at least one actuator and auxiliary wires are connected in series, so as to be activated by a common current.

13. The actuator as claimed in claim 4, wherein the sink is comprised of materials selected from the group consisting essentially of copper, copper alloys, aluminum, and aluminum alloys.

14. A thermally activated active material actuator adapted for increasing bandwidth, said actuator comprising:
an active material actuator element operable to undergo a reversible change in fundamental property, when exposed to or occluded from a thermal activation signal, so as to heat and activate the element or enable the element to be cooled and deactivated, respectively,
wherein the element presents an ambient rate of cooling when occluded from the signal after being activated, and a first cooling period based upon the ambient rate; and
a heat sink presenting a rate of thermal conductivity greater than the ambient rate, and autonomously engaging the element when the element is activated, so as to present a second cooling period shorter than the first period;
wherein the element defines a first length and width, and the sink presents a second width greater than the first width, and a second length not less than 25% of the first length so as to define a contact area of engagement.

15. The actuator as claimed in claim 4, wherein the sink defines at least one fluid opening.

16. The actuator as claimed in claim 4, further comprising a rack and pinion transmission intermediately coupling the sink and element, and driven by the change.

17. A thermally activated active material actuator adapted for increasing bandwidth, said actuator comprising:
an active material actuator element including at least one shape memory wire operable to undergo a reversible change in fundamental property, when exposed to or occluded from a thermal activation signal, so as to heat and activate the element or enable the element to be cooled and deactivated, respectively,
wherein the element presents an ambient rate of cooling when occluded from the signal after being activated, and a first cooling period based upon the ambient rate; and
a heat sink presenting a rate of thermal conductivity greater than the ambient rate, and autonomously engaging the element when the element is activated, so as to present a second cooling period shorter than the first period;
wherein the element and sink define a contact area of engagement and the sink defines at least one groove or channel configured to increase the contact area of engagement.

18. The actuator as claimed in claim 17, further comprising a plurality of wires, and the sink defines a plurality of grooves or channels, and the grooves or channels are further configured to space the wires.

19. The actuator as claimed in claim 18, further comprising plural sets of stackable mated parts included with the sink, wherein the wires are oriented to define plural rows and each set is configured to buttress a row, so as to space adjacent rows when stacked.

20. The actuator as claimed in claim 17, wherein the sink defines a surface area exposed to ambient conditions, and presents at least one fin configured to increase the surface area.

* * * * *